(12) United States Patent
Reimann et al.

(10) Patent No.: US 11,788,279 B1
(45) Date of Patent: *Oct. 17, 2023

(54) COMPOSITE INSULATION BATT (71) Applicant: INSULXTREME CORP, Las Vegas, NV (US)

(72) Inventors: J R Reimann, Palm Desert, CA (US); David Platt, West Jordan, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/389,308

(22) Filed: Jul. 29, 2021

Related U.S. Application Data (63) Continuation-in-part of application No. 16/823,097, filed on Mar. 18, 2020, now Pat. No. 11,111,665.

(60) Provisional application No. 63/069,026, filed on Aug. 22, 2020, provisional application No. 62/821,665, filed on Mar. 21, 2019.

(51) Int. Cl.
| | | |
|---|---|---|
| *E04B 1/76* | (2006.01) | |
| *E04C 2/38* | (2006.01) | |
| *B32B 3/04* | (2006.01) | |
| *B32B 3/08* | (2006.01) | |
| *B32B 3/06* | (2006.01) | |
| *B32B 5/02* | (2006.01) | |
| *B32B 5/18* | (2006.01) | |
| *B32B 5/32* | (2006.01) | |
| *B32B 27/12* | (2006.01) | |
| *B32B 27/06* | (2006.01) | |
| *E04B 1/80* | (2006.01) | |

(52) U.S. Cl.
CPC .............. *E04B 1/767* (2013.01); *B32B 3/04* (2013.01); *B32B 3/06* (2013.01); *B32B 3/085* (2013.01); *B32B 5/02* (2013.01); *B32B 5/18* (2013.01); *B32B 5/32* (2013.01); *B32B 27/065* (2013.01); *B32B 27/12* (2013.01); *E04B 1/806* (2013.01); *E04C 2/38* (2013.01); *B32B 2255/10* (2013.01); *B32B 2255/205* (2013.01); *B32B 2262/101* (2013.01); *B32B 2266/025* (2013.01); *B32B 2266/08* (2013.01); *B32B 2307/304* (2013.01); *B32B 2307/416* (2013.01); *B32B 2419/00* (2013.01); *E04B 2001/7691* (2013.01)

(58) Field of Classification Search
CPC .. E04B 1/767; E04B 1/806; E04B 2001/7691; B32B 3/04; B32B 3/06; B32B 5/02; B32B 27/12; B32B 2255/10; B32B 2262/101; B32B 2266/08; B32B 2307/304; B32B 2307/416; E04C 2/38
See application file for complete search history.

(56) References Cited

U.S. PATENT DOCUMENTS

| | | | |
|---|---|---|---|
| 2,700,633 | A | 1/1955 | Bovenkerk |
| 3,003,902 | A | 10/1961 | McDuff |
| 4,172,345 | A | 10/1979 | Alderman |
| 4,313,993 | A | 2/1982 | McGlory |

(Continued)

FOREIGN PATENT DOCUMENTS

| | | |
|---|---|---|
| WO | WO 1991017326 | 11/1991 |
| WO | WO 1993002853 | 2/1993 |

*Primary Examiner* — Patrick J Maestri
(74) *Attorney, Agent, or Firm* — PETERSON IP; Brett Peterson (57) ABSTRACT

A composite insulation batt is provided. The composite insulation batt includes a fiberglass insulation core within a sheath of closed cell plastic material and provides greatly increased insulating properties over conventional fiberglass insulation batts.

20 Claims, 12 Drawing Sheets

(56) References Cited

U.S. PATENT DOCUMENTS

| | | | | |
|---|---|---|---|---|
| 4,669,632 | A * | 6/1987 | Kawasaki | F16L 59/08 |
| | | | | 220/592.27 |
| 5,330,816 | A | 7/1994 | Rusek | |
| 5,817,387 | A * | 10/1998 | Allwein | E04B 1/7662 |
| | | | | 428/131 |
| 5,848,509 | A * | 12/1998 | Knapp | D04H 1/593 |
| | | | | 52/406.1 |
| 5,987,833 | A | 11/1999 | Heffelfinger et al. | |
| 6,083,603 | A * | 7/2000 | Patel | E04B 1/767 |
| | | | | 428/128 |
| 6,183,838 | B1 | 2/2001 | Kannankeril | |
| 2006/0201089 | A1* | 9/2006 | Duncan | E04B 1/767 |
| | | | | 52/309.8 |
| 2010/0065206 | A1 | 3/2010 | Romes | |
| 2016/0272774 | A1 | 9/2016 | Snider | |
| 2019/0017723 | A1* | 1/2019 | Surraco | B32B 3/10 |
| 2020/0040569 | A1* | 2/2020 | Aspenson | E04B 1/7604 |
| 2020/0191318 | A1* | 6/2020 | Yuasa | B32B 19/02 |
| 2020/0200317 | A1* | 6/2020 | Shima | B32B 15/20 |
| 2020/0282695 | A1* | 9/2020 | Tokiwa | B29C 44/445 |
| 2020/0378544 | A1* | 12/2020 | Bock | B60R 13/0815 |

\* cited by examiner

COMPOSITE INSULATION BATT

PRIORITY

The present application is a continuation-in-part of U.S. application Ser. No. 16/823,097, filed Mar. 18, 2020, which claims the benefit of U.S. Provisional Application Ser. No. 62/821,665, filed Mar. 21, 2019, which applications are herein incorporated by reference in its entirety. The present application claims the benefit of U.S. Provisional Application Ser. No. 63/069,026, filed Aug. 22, 2020, which is herein incorporated by reference in its entirety.

THE FIELD OF THE INVENTION

The present invention relates to insulation. In particular, examples of the present invention relates to a composite insulation batt for use in insulating buildings and other structures.

BACKGROUND

Insulation is typically used in construction to improve the functionality of the building for its occupants. Insulation is used to reduce the heating and cooling load of the structure and improve temperature regulation within the structure. Insulation can also provide other benefits such as sound reduction within the structure.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

The disclosure particularly describes how to increase the insulating properties of fiberglass insulation batts. Particularly, the present disclosure describes a composite insulation batt with dramatically increased R-value (the resistance to conductive heat transfer through the insulation) as compared to a traditional insulation batt.

Figure 1:
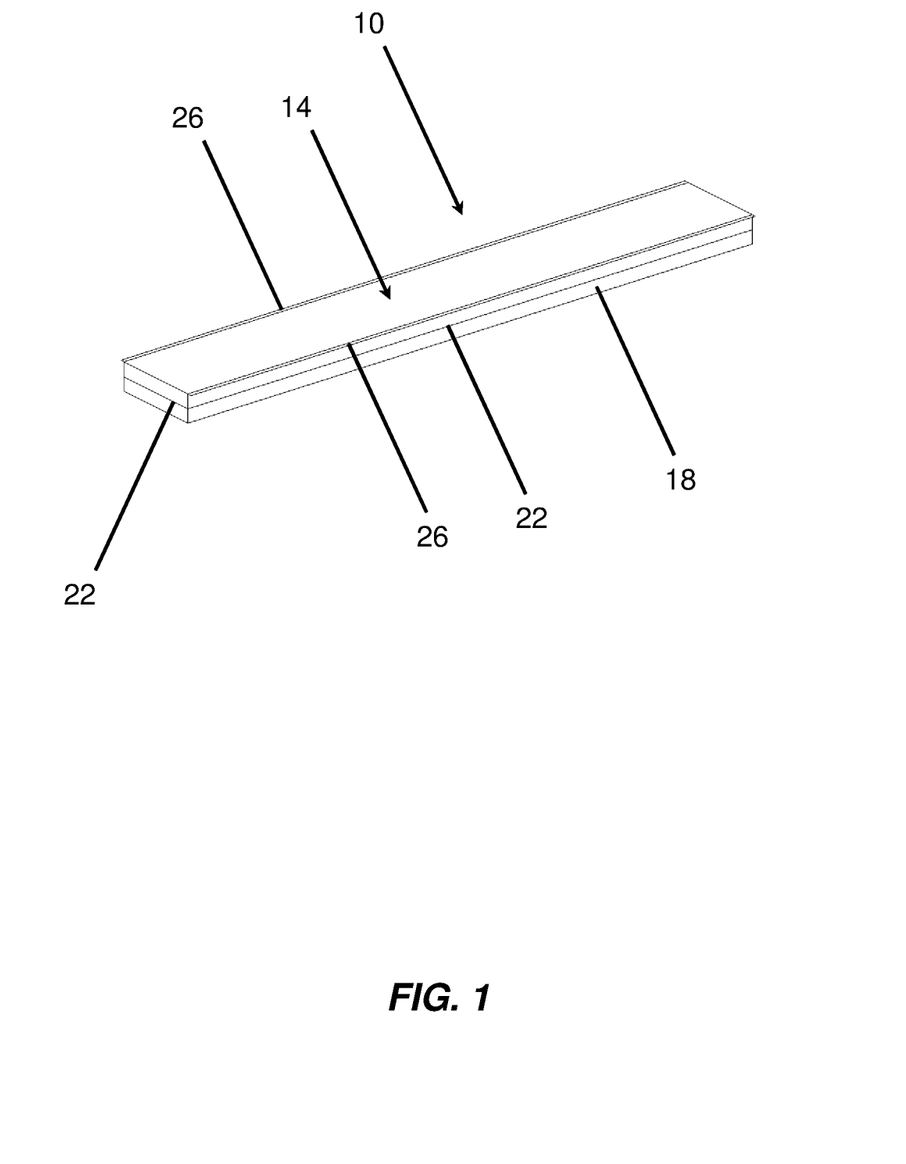
FIG. 1 is a drawing which shows a perspective view of a composite insulation batt.

Turning now to FIG. 1, a perspective view of an example composite insulation batt 10 is shown. The composite insulation batt includes a fiberglass insulation batt 14 forming its core and an insulating sheath 18 which is wrapped around the fiberglass batt core 14. The composite insulation batt 10 is sized to fit within common wall, floor, or ceiling cavities and thus may often be about 15 inches wide or about 23 inches wide, and may often be about 3.5 inches thick, about 5.5 inches thick, about 7.5 inches thick, about 9.5 inches thick, or about 11.5 inches thick. The composite insulation batt 10 may be manufactured in standard lengths to fit common building cavities such as being formed in standard lengths to fit 8 foot, 9 foot, or 10 foot walls. The composite insulation batt 10 may also be manufactured to custom lengths or may be provided in long lengths and may be cut to length for installation. For certain projects, the composite insulation batt 10 may be manufactured on location to create needed lengths.

The insulating sheath 18 is wrapped around the long faces of the core fiberglass batt 14 and frequently covers the end faces of the fiberglass batt 14. In manufacture, the insulating sheath 18 has a long length to extend over the fiberglass batt 14 and a width which allows it to be wrapped around the fiberglass batt 14 with some overlap for fastening at a seam 22 along the length of the fiberglass batt 14. As is shown, the sheath 18 may be sealed together around the ends of the composite insulation batt 10.

The insulating sheath 18 fits snugly around the fiberglass batt core 14 and does not easily shift or move around the batt core 14. The structure of the sheath 18 surrounding the fiberglass batt core 14 makes the composite insulation batt 10 handle more rigidly than a bare fiberglass insulation batt. This may assist installers in placing the composite insulation batt 10 into building cavities as the composite insulation batt 10 is less likely to sag or bend due to gravity during installation. Where the building cavity contains a wire, electrical box, or other intrusive item, the composite insulation batt 10 may be cut or trimmed with conventional tools to fit around the intrusion.

The sheath 18 is also beneficial in containing fiberglass fibers from the fiberglass insulation batt core 14. Workers installing the composite insulation batt 10 are typically exposed to significantly less fiberglass fiber and dust.

Figure 2:
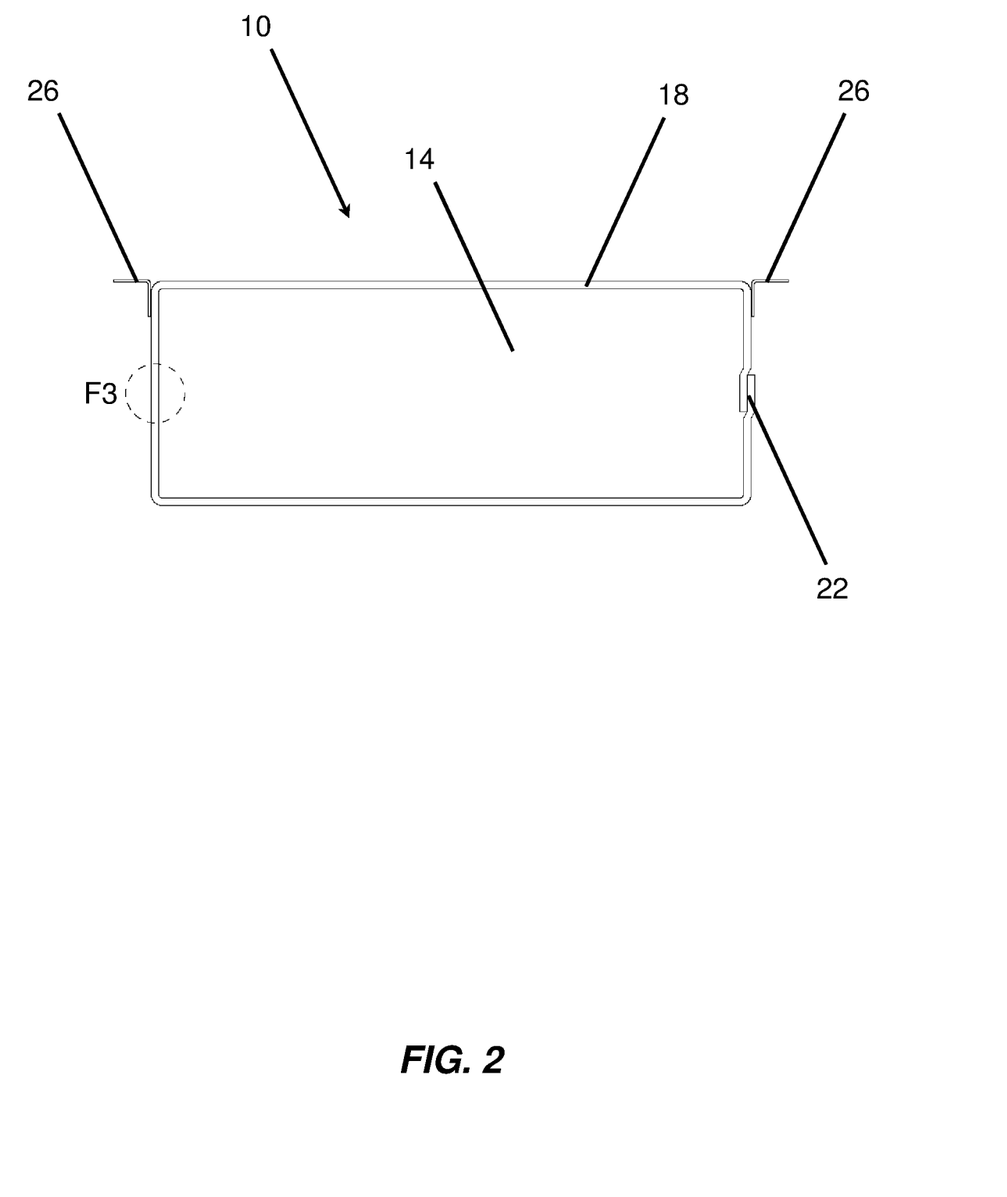
FIG. 2 is a drawing which shows a cross-sectional view of the composite insulation batt.

FIG. 2 shows a cross-sectional view of the composite insulation batt 10 taken across the length of the composite insulation batt 10. FIG. 2 shows the elongate batt of fiberglass insulation 14 which forms the core of the composite insulation batt 10. The fiberglass insulation batt 14 is encased within the insulating sheath 18. The insulating sheath 18 is wrapped around the inside and outside faces and the two sides of the fiberglass insulation batt 14 and the long edges of the insulating sheath 18 are joined together at a seam 22 along the length of the composite insulation batt 10. The insulating sheath 18 is a closed cell plastic material. Accordingly, the edges of the insulating sheath material may be attached together along the seam 22 with adhesive, fusion, etc. If desired, staple/attachment flanges 26 may be attached to the composite insulation batt 10. The attachment flanges 26 are elongate and extend along the length of the composite insulation batt 10. The attachment flanges may typically be formed from paper or plastic and may typically be attached to the insulating sheath 18 with adhesive or by fusing the materials together. The attachment flanges are used to attach the composite insulation batt 10 to building wall studs, joists, etc.

Figure 3A:
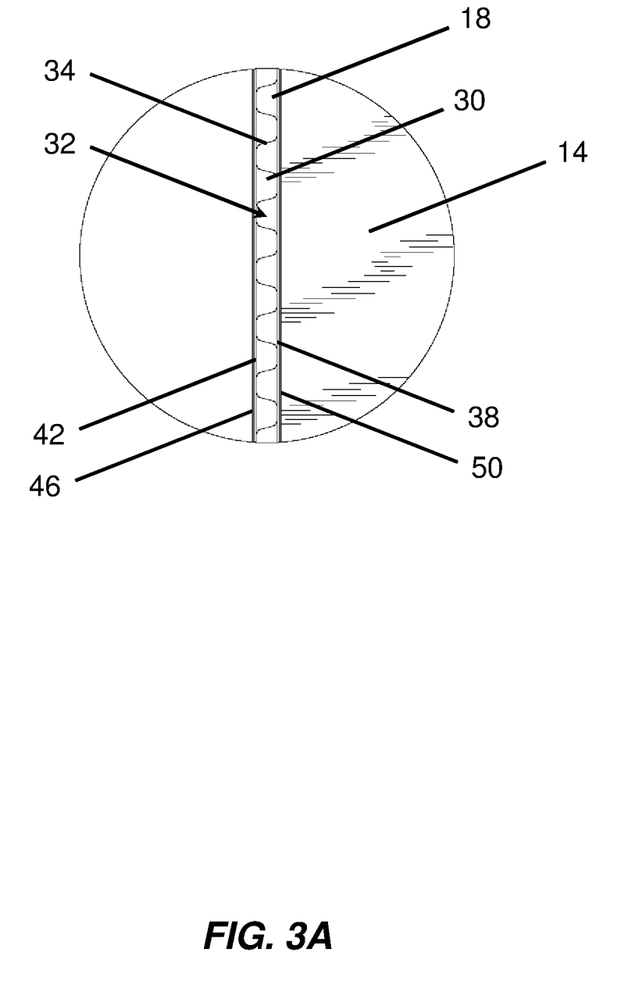
FIG. 3A is a drawing which shows a more detailed cross-sectional view of a portion of the composite insulation batt.

FIG. 3A shows an enlarged view of a section of the edge of the fiberglass batt 14 and the insulating plastic sheath 18 as indicated at F3 in FIG. 2. The insulating sheath 18 is closely fit around the fiberglass batt 14 and need not be attached to the fiberglass batt core 14 with adhesive to achieve sufficient rigidity and resist relative movement between the insulating sheath 18 and fiberglass batt 14. The insulating sheath 18 is formed with a core 30 of closed cell plastic. In one example, the core 30 is formed from polyethylene plastic. As shown, the core 30 of the insulating sheath 18 is formed with uniformly sized bubble pockets 32. Such a structure includes a 3D formed central sheet 34 of plastic attached to an inside face sheet 38 and an outside face sheet 42 of plastic. In another example, the core 30 may be formed with a larger number of irregularly or regularly shaped closed cells between thin layers of plastic.

The insulating plastic sheath 18 is preferably formed with an outer layer 46 of a reflective material such as aluminum or metalized plastic, polyester, or polyethylene terephthalate film (e.g. Mylar) and also an inner layer 50 of a reflective material such as aluminum or metalized plastic, polyester, or polyethylene terephthalate film (e.g. Mylar). The outer layer 46 and inner layer 50 of reflective material are attached to the closed cell core 30 during manufacture of the insulating sheath material. In some applications, the inner face of the insulating sheath 18 need not include a reflective layer 50 to achieve the benefit of the invention.

The core 30 of the insulating sheath 18 is a layer of low density plastic material. The core 30 is typically about 90 percent or greater air space and is preferably about 95 percent or greater air space and may be a foam, closed cell plastic foam, or a more uniformly structured closed cell plastic foam which provides more uniform air cavities or bubbles therein. As discussed, the example core 30 is formed by layers of polyethylene which have been formed to create more uniform bubbles therebetween. Typical manufacture includes forming the inner layer 34 of plastic to create the bubble cells, thermally fusing the inner layer 34 to the inside face layer 38 and outside face layer 42 of plastic, and attaching the outer reflective layer 46 and inner reflective layer 50 to the inside face layer 38 and outside face layer 42. All of these layers 34, 38, 42, 46, 50 may be thermally attached to each other during the construction of the sheath material 18.

Figure 3B:
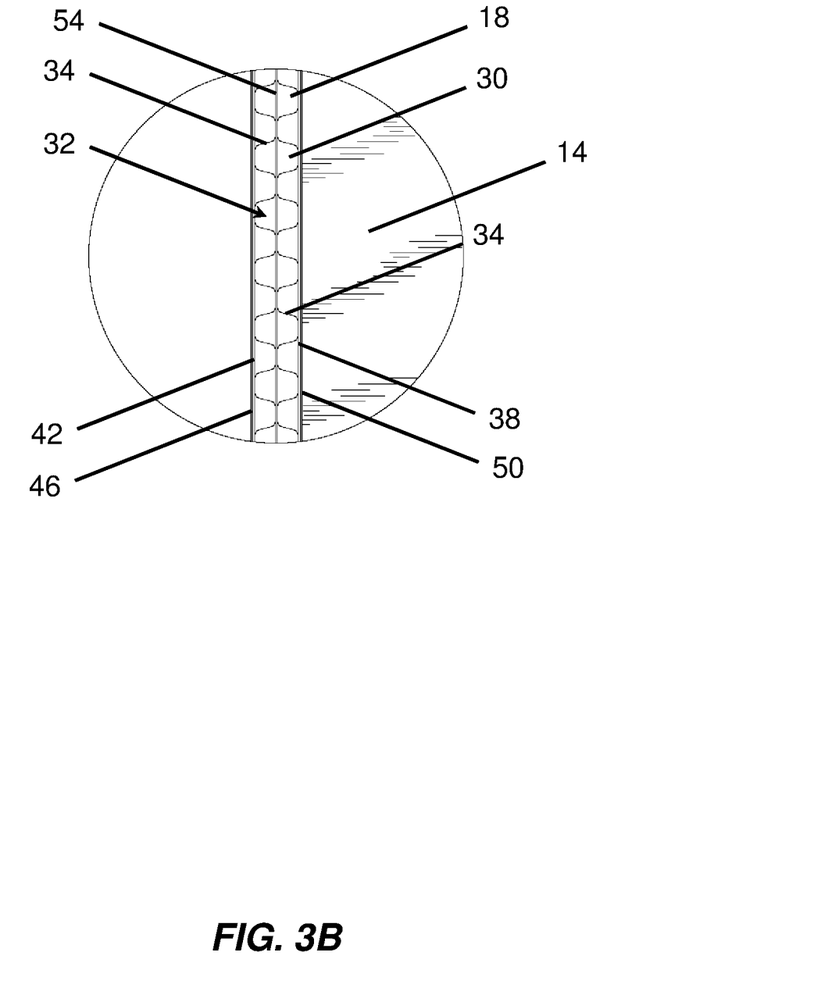
FIG. 3B is a drawing which shows a more detailed cross-sectional view of a portion of the composite insulation batt.

FIG. 3B shows another enlarged view of the section of the edge of the fiberglass batt 14 and the insulating plastic sheath 18 indicated at F3 in FIG. 2. In this example, the insulating sheath 18 is formed with a core 30 of closed cell plastic which includes two distinct layers of closed cell material. The core 30 may again be formed from polyethylene plastic. As shown, the core 30 of the insulating sheath 18 is formed with two layers of uniformly sized bubble pockets 32. Such a structure includes a generally flat central sheet of plastic 54, two 3D formed sheets 34 of plastic attached to alternate sides of the central sheet 54 with an inside face sheet 38 and an outside face sheet 42 of plastic attached to the 3D formed sheets 34 to create bubbles between these sheets of plastic.

The example insulating plastic sheath 18 is preferably formed with an outer layer 46 of a reflective material such as aluminum or metalized polyester film (e.g. Mylar) and also an inner layer 50 of a reflective material such as aluminum or metalized polyester film. The outer layer 46 and inner layer 50 of reflective material are attached to the closed cell core 30 during manufacture of the insulating sheath material. In some applications, the inner face of the insulating sheath 18 need not include a reflective layer 50 to achieve the benefit of the invention.

The core 30 of the insulating sheath 18 is thicker than the core 30 shown in FIG. 3A and increases the insulating properties of the composite insulation batt 10. The example material forming the insulating sheath 18 may be approximately 0.3 inches thick while the example material forming the insulating sheath 18 shown in FIG. 3A is approximately 0.15 inches thick.

Figure 4:
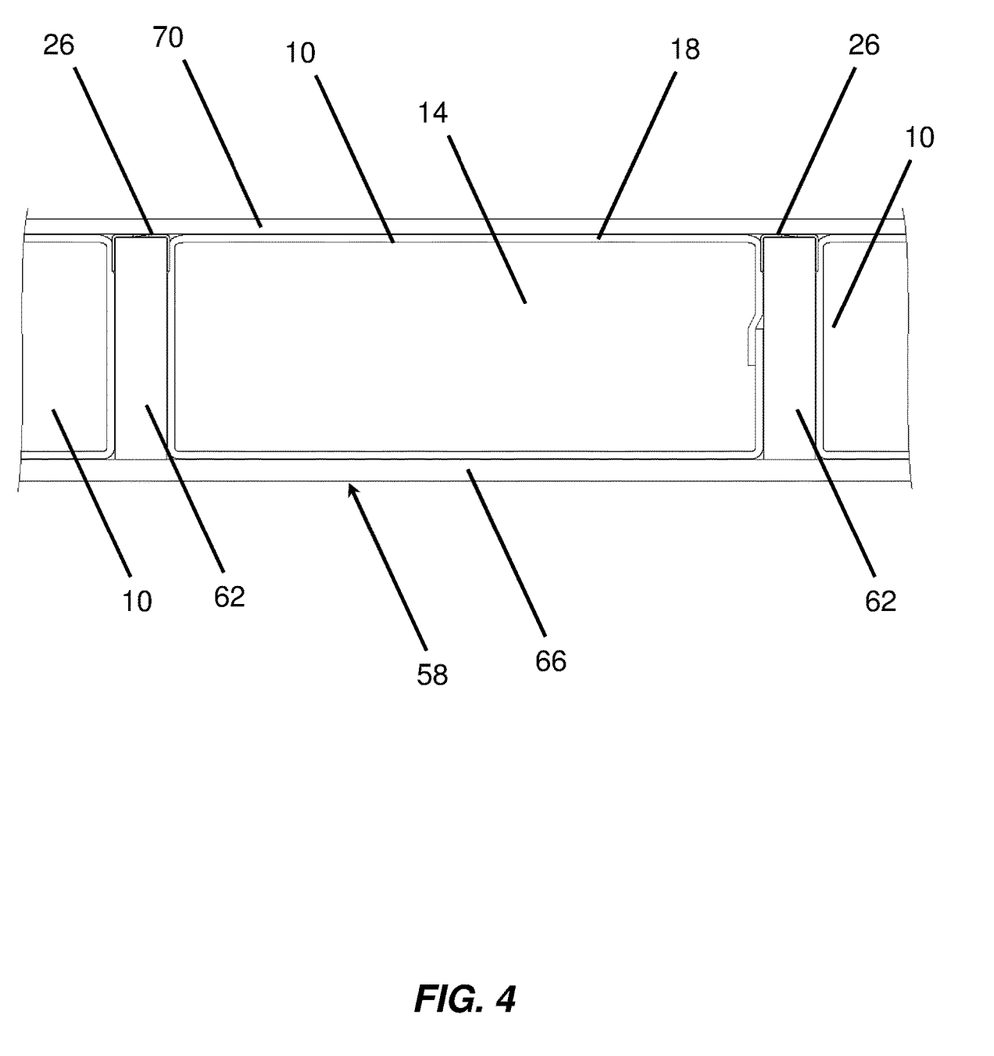
FIG. 4 is a drawing which shows a cross-sectional view of the composite insulation batt installed in a building cavity.

FIG. 4 shows a composite insulation batt 10 installed in a building cavity 58. The building cavity may be defined by a first framing stud 62, a second framing stud 62, a first panel 66, and a second panel 70. The studs 62 may be metal or wood studs and may be part of a wall, floor, or ceiling of a building, for example. The first panel 66 may an exterior building surface or sheathing, a roof surface, an interior wall surface, etc. The second panel 70 may be an interior wall surface, a floor surface, a ceiling or roof space, etc. The composite insulation batt 10 fits snugly into the building cavity 58. The added rigidity of the composite insulation batt 10 can assist the installers in properly filling the building cavity without leaving gaps and spaces which degrade the performance of insulation batts. The attachment flanges 26 may be used to attach the composite insulation batt 10 to the building framing 62 and prevent movement of the composite insulation batt 10 during and after construction of the building. The attachment flanges 26 are often stapled to the building flaming members 62. Where the composite insulation batt 10 is cut to length to fit the batt 10 into a building cavity 58, careful cutting and fitting of the composite insulation batt 10 causes the cut ends of the composite insulation batt 10 to fit snugly against the adjacent bottom rail, top rail, or other framing member defining the ends of the cavity 58 and preserves the performance of the composite insulation batt 10.

Figure 5:
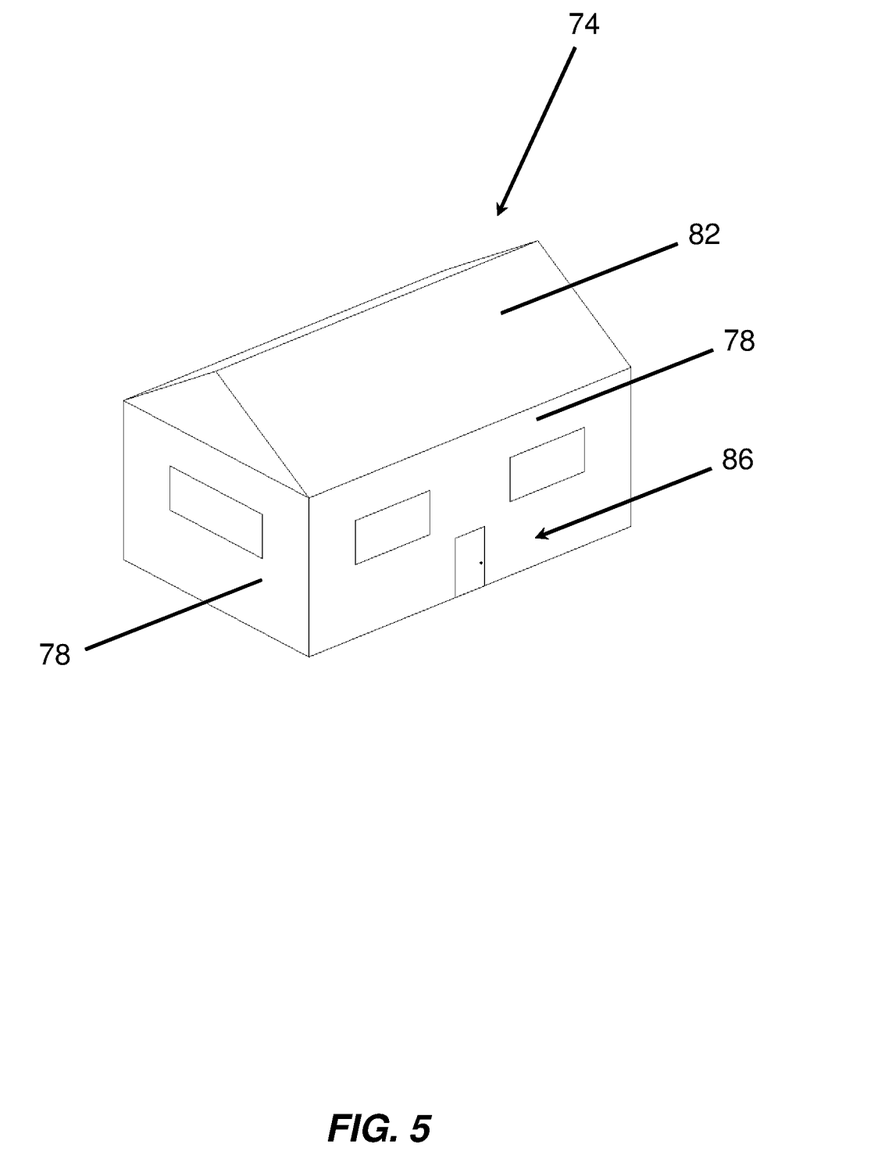
FIG. 5 shows a drawing of a building having the composite insulation batt.

FIG. 5 shows an example building 74 and indicates the many locations where the composite insulation batt 10 may be used in a building cavity 58. The building cavity 58 may be found in a wall 78, a ceiling or roof 82, an interior floor (indicated at 86) or another part of the building 74 where insulation is desired. Typically, the composite insulation batt 10 is disposed between structural framing members of the building 74 and is often disposed adjacent a panel of building sheathing material.

Figure 6:
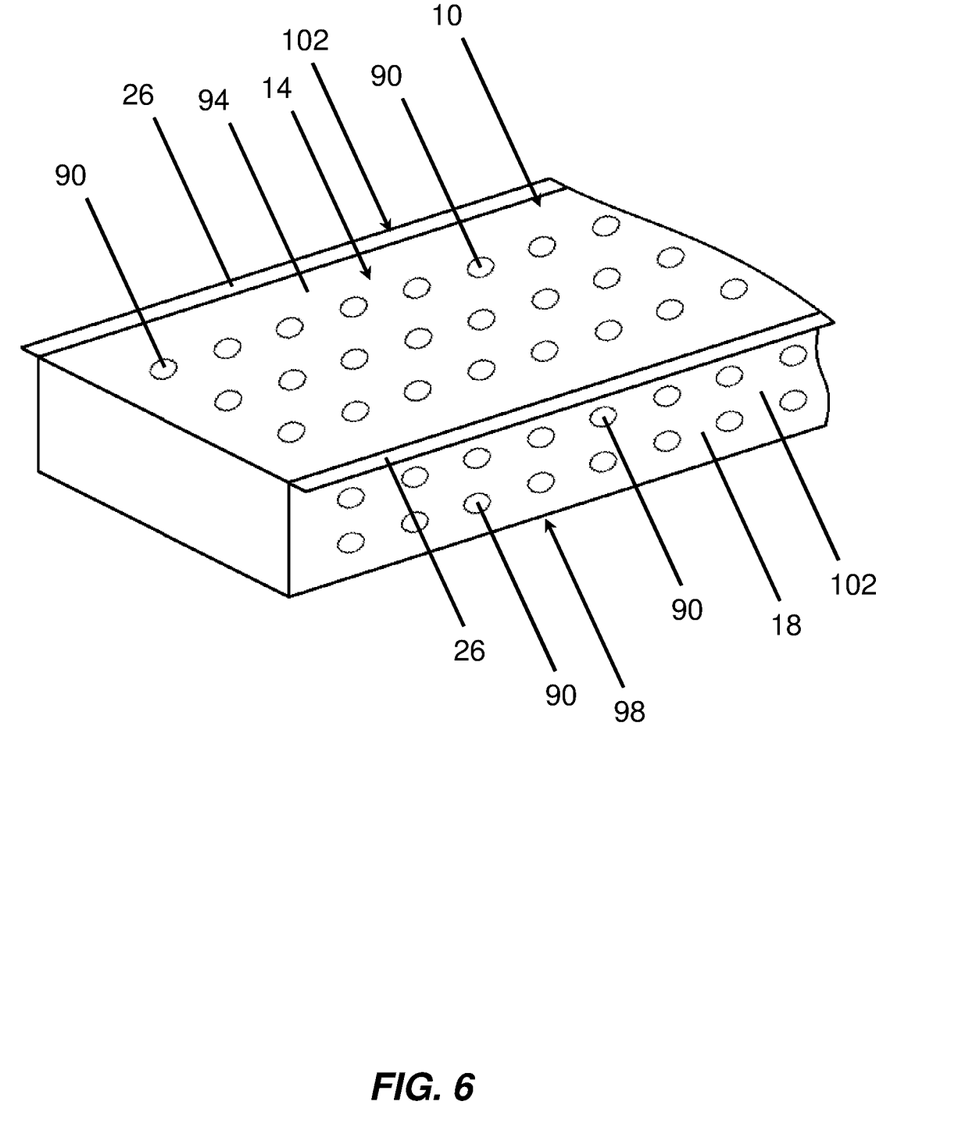
FIG. 6 shows a perspective view of a portion of the composite insulation batt.

FIG. 6 shows a perspective view of a portion of the composite insulation batt 10. The composite insulation batt 10 contains the structure and features described above and some features, although present, are not described for clarity in describing other features of the composite insulation batt. An insulating sheath 18 is wrapped around the fiberglass batt core 14 and covers the batt core 14. As described before, the insulation sheath 18 includes attachment flanges 26 which are formed on two long edges of one face of the composite insulation batt 10 The attachment flanges 26 are used to attach the composite insulation batt 10 to an insulation cavity in a building.

In this example, the insulating sheath 18 is formed with a core of closed cell plastic which includes one or two distinct layers of closed cell material. The core may be formed from polyethylene plastic. The core of the insulating sheath 18 is formed with one or two layers of uniformly sized bubble pockets. Such a structure may include a generally flat central sheet of plastic with two 3D formed sheets of plastic attached to alternate sides of the central sheet with an inside face sheet and an outside face sheet of plastic attached to the 3D formed sheets to create bubbles between these sheets of plastic. The example insulating plastic sheath 18 is also formed with an outer layer of a reflective material such as aluminum or metalized polyester film (e.g. Mylar) and also an inner layer of a reflective material such as aluminum or metalized polyester film.

The composite insulation batt 10 also includes a plurality of insulating spacers 90 attached to the exterior surface of the insulation sheath 18. The insulating spacers 90 are formed from an insulating material and form a discrete projection with extends beyond the plane of the insulation sheath 18. In one example, the insulating spacers 90 are small disks of felt which are attached to the insulation sheath 18 with an adhesive. Alternatively, the insulating spacers 90 may be made from closed or open celled foam, and may be made from the same material as the insulating sheath 18. The insulating spacers 90 could be attached to the insulating sheath 18 with adhesive or by thermal fusion. The example insulating spacers 90 are approximately 1 inch in diameter and are between about one twentieth of an inch and about one third of an inch thick, and more preferably between about one eighth of an inch and about one fourth of an inch in thickness. The insulation spacers 90 may, however, be made thicker as needed. The insulating spacers are attached to the front face 94 and rear face 98 of the composite insulation batt 10. The insulating spacers 90 may also be attached to the side faces 102 of the composite insulation batt 10 as shown. In the example composite insulation batt 10, the insulating spacers 90 are attached in a grid pattern across the front face 94, rear face 98, and side faces 102 of the batt 10. The insulating spacers 90 could be formed in differing shapes and patterns. For example, the insulating spacers 90 could be narrow insulating strips or wavy strips that are attached across the composite insulation batt 10.

Figure 7:
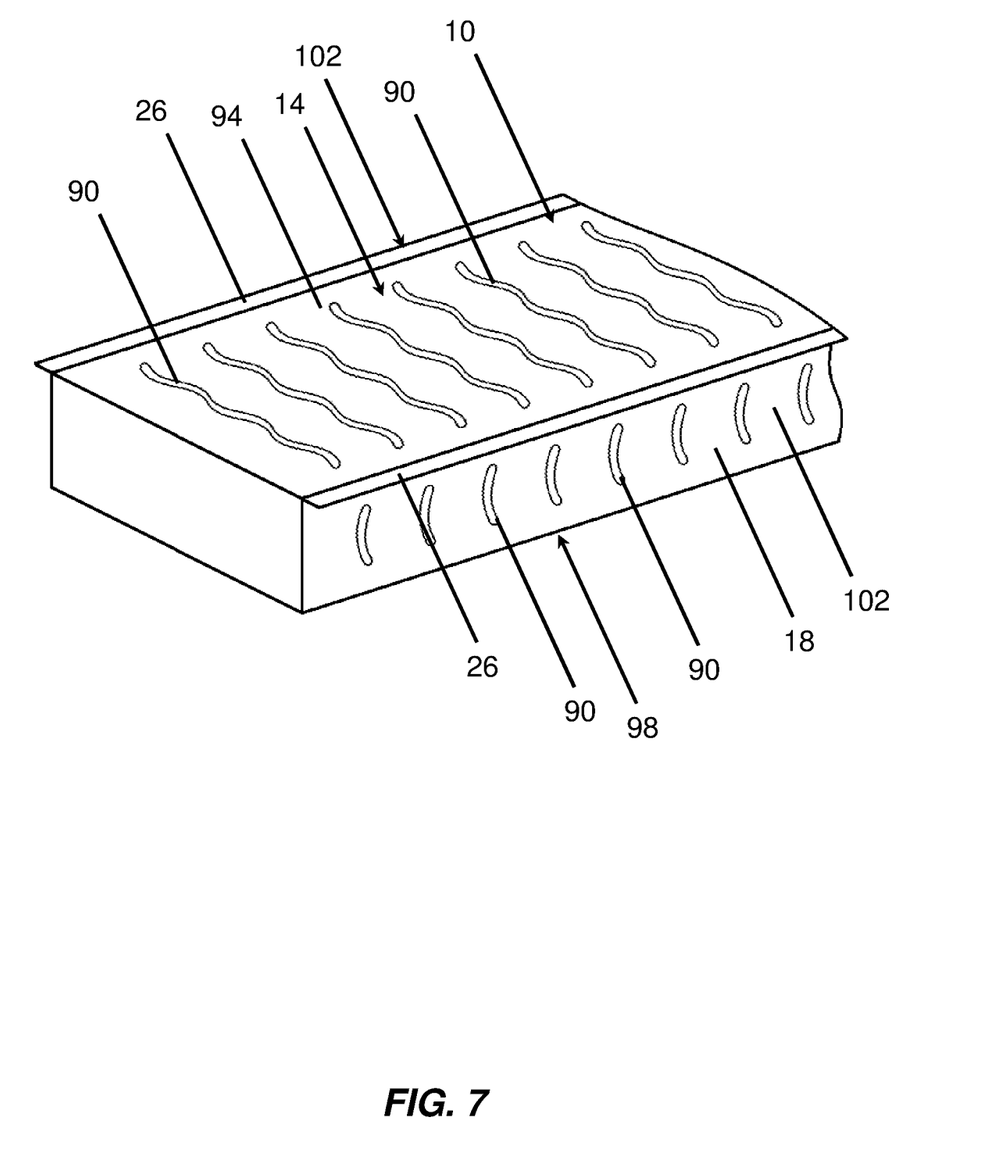
FIG. 7 shows a perspective view of a portion of the composite insulation batt.

FIG. 7 shows a perspective view of a portion of the composite insulation batt 10 similar to that shown in FIG. 6. In this example, the insulating spacers 90 are wavy strips which extend across the width of the composite insulation batt 10. If the composite insulation batt 10 is installed vertically into a building wall cavity the insulating spacers 90 would be oriented horizontally across the composite insulation batt 10. The insulating spacers 90 could also be straight instead of wavy.

Figure 8:
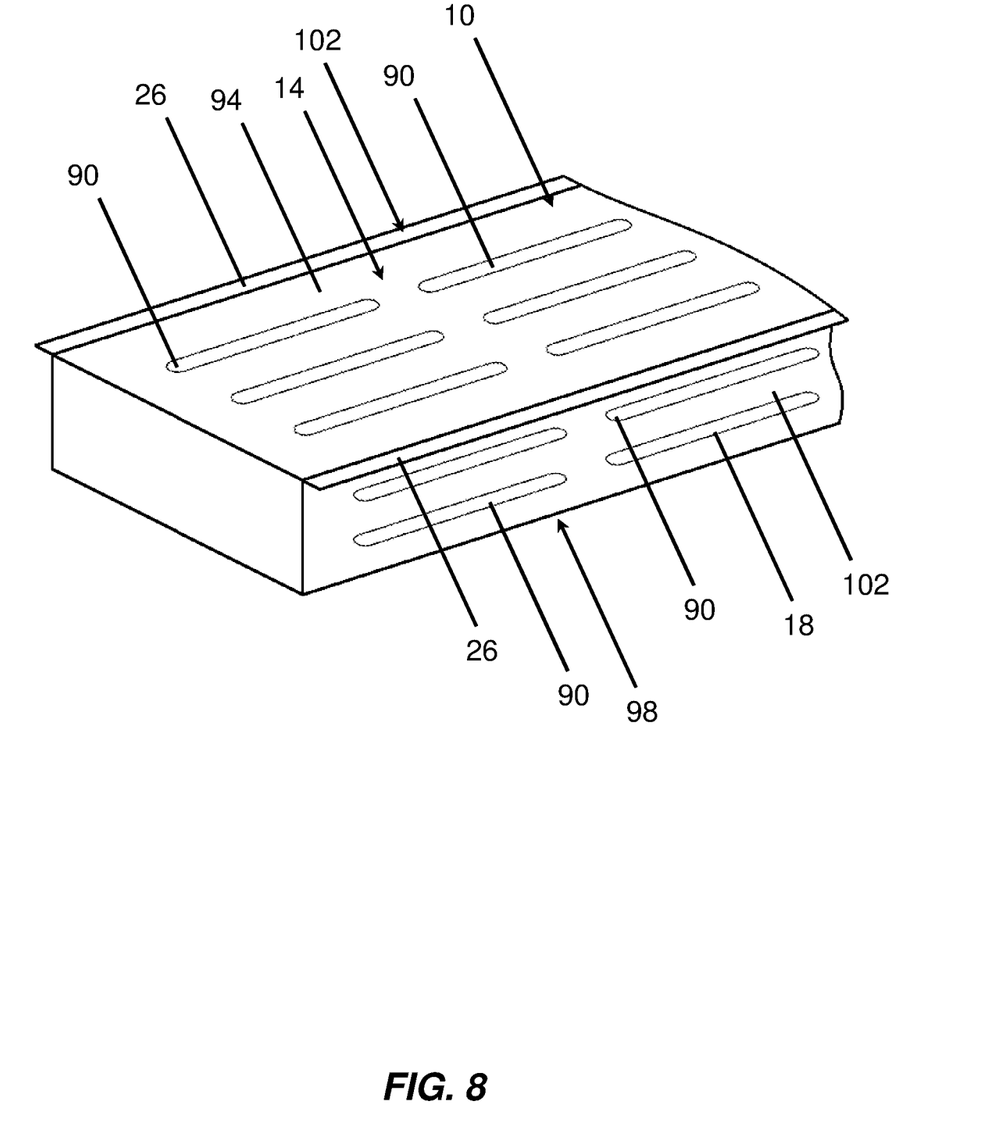
FIG. 8 shows a perspective view of a portion of the composite insulation batt.

FIG. 8 shows a perspective view of a portion of the composite insulation batt 10 similar to that shown in FIG. 6. In this example, the insulating spacers 90 are elongated ovals or straight strips which extend longitudinally along the length of the composite insulation batt 10. If the composite insulation batt 10 is installed vertically into a building wall cavity the insulating spacers 90 would be oriented vertically along the composite insulation batt 10.

Figure 9:
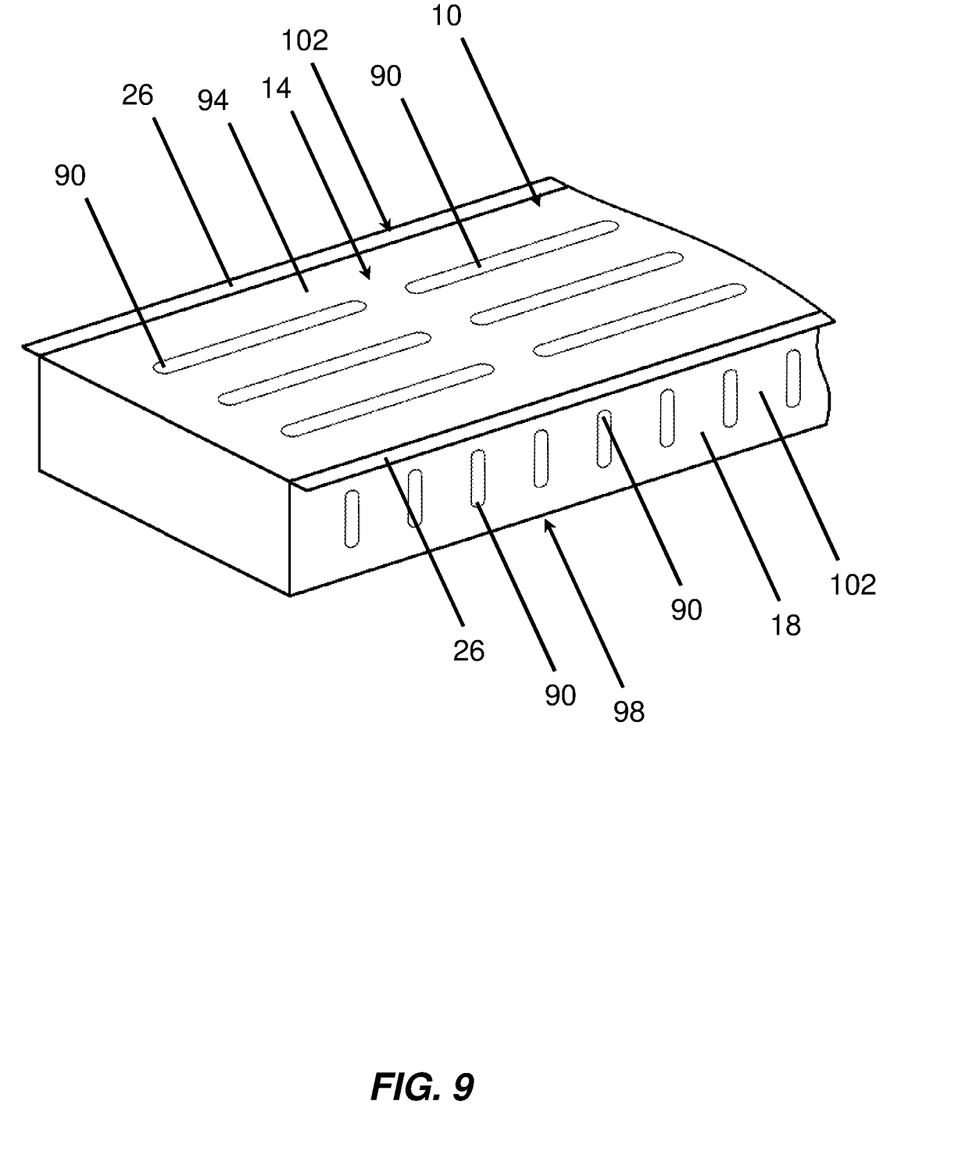
FIG. 9 shows a perspective view of a portion of the composite insulation batt.

FIG. 9 shows a perspective view of a portion of the composite insulation batt 10 similar to that shown in FIG. 6.

In this example, the insulating spacers 90 are elongated ovals or straight strips which extend both across the composite insulation batt 10 and longitudinally along the length of the composite insulation batt 10.

The insulating spacers 90 occupy a small amount of the surface of the insulating sheath 18. The example round insulating spacers 90 may be placed approximately 4 inches apart in a grid as shown and, in this configuration, will occupy approximately 5 percent of the surface area of the insulating sheath 18. Smaller disks, or other small shapes, could be used as the insulating spacers 90. Using insulating spacers 90 which are one half inch disks, for example, would reduce the area of the insulating spacers 90 to approximately 1 percent of the surface area of the insulating sheath 18. The insulating spacers 90 may thus occupy about 10 percent or less of the surface of the insulation sheath where they are found, and may more preferably occupy about 5 percent or less of the surface area of the insulating sheath or about 2 percent or less of the surface of the insulating sheath.

Figure 10:
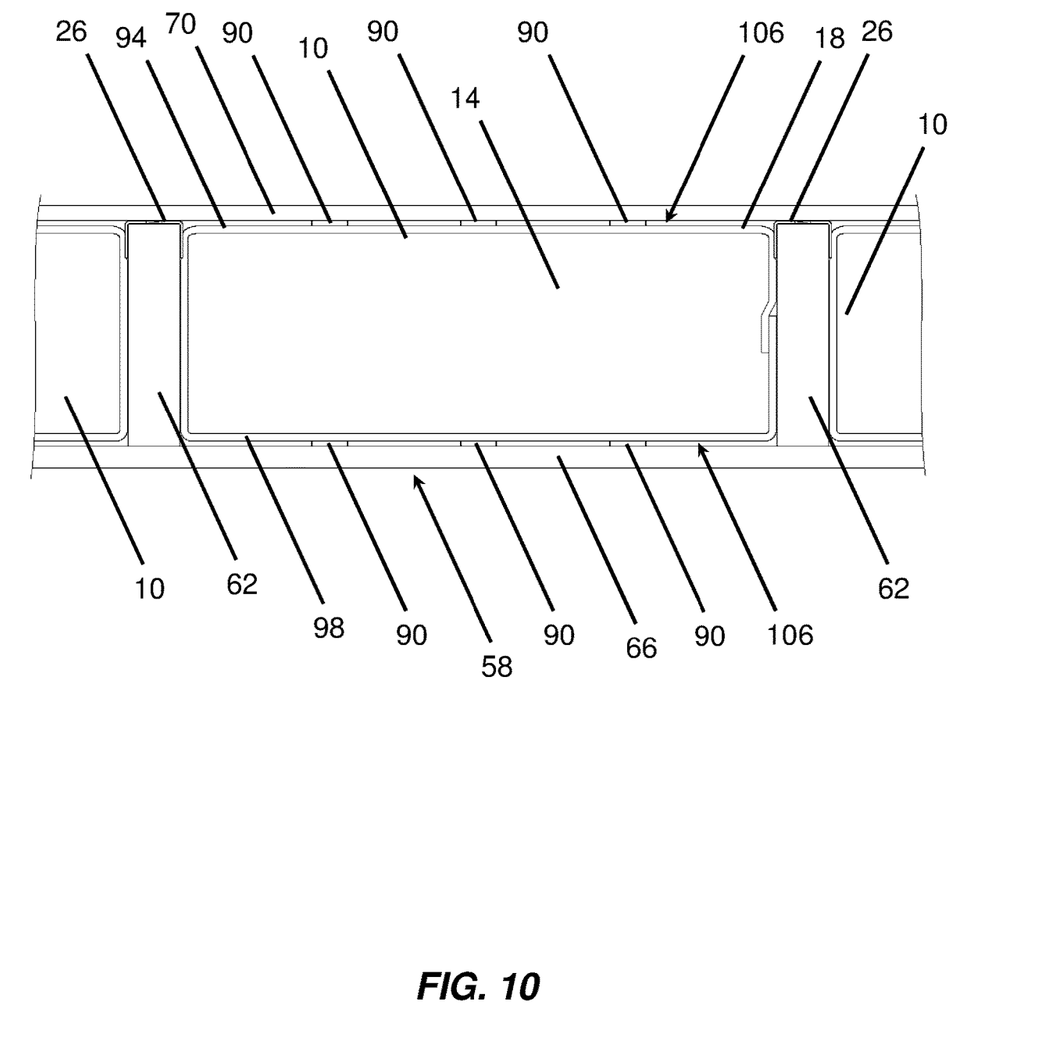
FIG. 10 is a drawing which shows a cross-sectional view of the composite insulation batt installed in a building cavity.

FIG. 10 shows a composite insulation batt 10 with insulation spacers 90 installed into a building cavity 58. The building cavity may be defined by a first framing stud 62, a second framing stud 62, a first panel 66, and a second panel 70. The studs 62 may be metal or wood studs and may be part of a wall, floor, or ceiling of a building, for example. The first panel 66 may an exterior building surface or sheathing, a roof surface, an interior wall surface, etc. The second panel 70 may be an interior wall surface, a floor surface, a ceiling or roof space, etc. The composite insulation batt 10 includes insulating spacers 90 attached to the front face 94 and the rear face 98 of the composite insulation batt 10.

When the composite insulation batt 10 is installed into a building, the front face 94 and rear face 98 typically face an interior sheathing material such as sheetrock and/or an exterior sheathing material such as plywood. The side faces 102 typically face framing studs which form the cavity into which the composite insulation batt 10 is placed. The insulating spacers 90 space the insulating sheath 18 away from the adjacent building structure by a small distance when the composite insulation batt 10 is installed into a building and create an air gap/space 106 between the composite insulation batt 10 and the building surface. This eliminates conductive heat transfer between the building surface and the insulating sheath and limits the heat transfer between the building surface and the insulating sheath 18 to radiative heat transfer and convective heat transfer. A small amount of conductive heat transfer may be present through the insulating spacers 90. The insulating spacers 90 are primarily beneficial on the front face 94 and rear face 98 of the composite insulation batt 10 as these typically face the interior and exterior building sheathing. These faces 94, 98 are aligned with the building exterior surface. The side faces 102 are typically in contact with framing studs. Placing insulating spacers 90 on the side faces may further reduce heat transfer.

In some larger building cavities, two or more composite insulation batts 10 are installed into a single cavity to increase the amount of insulation in the cavity. The front face 94 of one composite insulation batt 10 is installed against the back face 98 of another composite insulation batt 10. In this configuration, the adjacent insulation sheaths 18 of the adjacent composite insulation batts 10 are spaced apart from each other by the insulating spacers 90.

The insulating spacers 90 provide a significant improvement in the insulating performance of the composite insulation batt 10. Heat flow through the composite insulation batt 10 requires radiative and convective flow into the insulating sheath 18 from the building sheathing, conductive or convective heat flow through the insulating sheath, contact heat flow into the fiberglass batt core 14, conductive flow through the fiberglass batt core, contact heat flow into the insulating sheath 18, conductive or convective heat flow through the insulating sheath 18, and radiative or convective heat flow to the building sheathing. There are many breaks in the heat flow path and significant resistance to heat flow.

Figure 11:
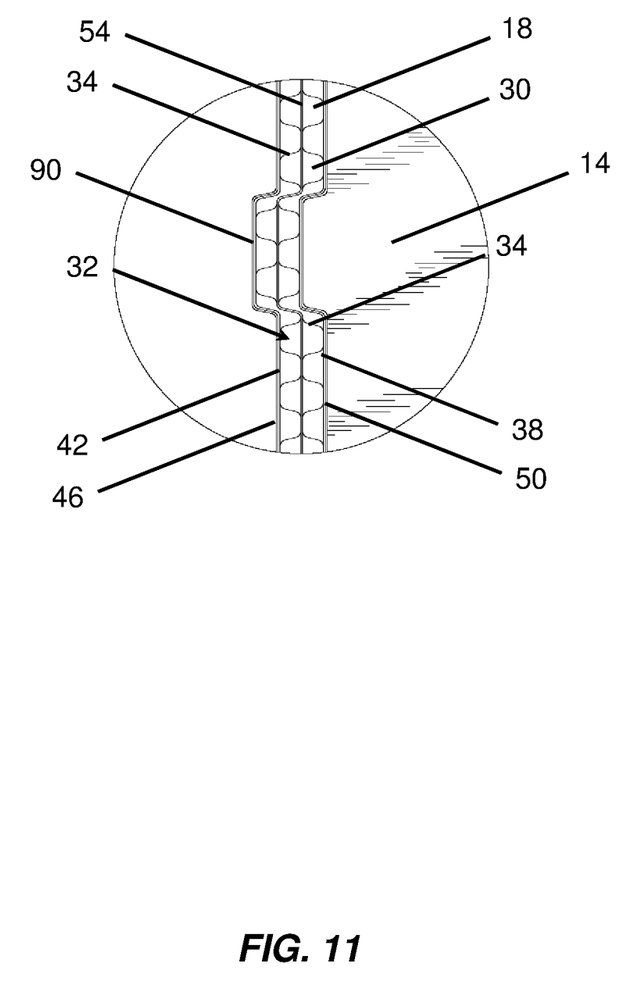
FIG. 11 is a drawing which shows a more detailed cross-sectional view of a portion of the composite insulation batt.

FIG. 11 shows another enlarged view of a section of the edge of the composite insulation batt 10 and shows the fiberglass batt 14 and the insulating plastic sheath 18. In this example, the insulating sheath 18 is formed with a core 30 of closed cell plastic which includes two distinct layers of closed cell material as discussed above. The core 30 may again be formed from polyethylene plastic. As shown, the core 30 of the insulating sheath 18 is formed with two layers of uniformly sized bubble pockets 32. Such a structure includes a generally flat central sheet of plastic 54, two 3D formed sheets 34 of plastic attached to alternate sides of the central sheet 54 with an inside face sheet 38 and an outside face sheet 42 of plastic attached to the 3D formed sheets 34 to create bubbles 32 between these sheets of plastic.

The example insulating plastic sheath 18 is preferably formed with an outer layer 46 of a reflective material such as aluminum or metalized polyester film (e.g. Mylar) and also an inner layer 50 of a reflective material such as aluminum or metalized polyester film. The outer layer 46 and inner layer 50 of reflective material are attached to the closed cell core 30 during manufacture of the insulating sheath material. In some applications, the inner face of the insulating sheath 18 need not include a reflective layer 50 to achieve the benefit of the invention.

FIG. 11 shows how the insulating spacers 90 may be formed as part of the insulating sheath 18. For example, the insulating sheath 18 could be embossed or thermally formed to create sections of the insulating sheath 18 which protrude from the generally planar surface of the insulating sheath 18 and thereby form insulating spacers 90 which will space the insulating sheath 18 from the surface of the wall sheathing or other building surface with which the composite insulation batt 10 is in contact. If two composite insulation batts 10 are placed against each other in a building cavity, the formed insulating spacers 90 will space the composite insulation batts apart from each other and create a small air gap between their exterior surfaces. The formed insulating spacers 90 could be round as shown in FIG. 6, rectangular, domed, wave shapes, or other shapes. It is generally desirable to create insulating spacers 90 which are smaller in size and occupy a relatively small percentage of the surface of the insulating sheath 18.

The composite insulation batt 10 is more user friendly than conventional fiberglass insulation batts for several reasons. The sheath 18 encases the fiberglass batt core 14 and largely shields the installers from the irritating and injurious fiberglass fibers. The rigidity of the composite insulation batt 10 increases the ease of measuring, cutting, and installing the composite insulation batt 10.

Above all, the composite insulation batt 10 dramatically increases the R-value (insulating capability) of the insulation batt. The composite insulation batt 10 provides a dramatically increased R-value compared to a similarly sized batt of fiberglass insulation, allowing a significantly increased R-value of insulation to be provided within a given thickness of building cavity. The composite insulation batt 10 frequently provides an R-value which is greater than the sum of the R-values of its component parts. In many cases, the composite insulation batt 10 provides double or more than double the R-value of an equivalently sized fiberglass insulation batt. This can become important in several situations.

In new construction, local building codes more commonly require a minimum R-value to be achieved for the outer envelope of the building. Windows have a low R-value compared to insulated framed walls and lower the average R-value of the building. Thus, it can be difficult to install a desired number of windows in a building and meet the necessary average R-value required by code. The composite insulation batt 10 dramatically increases the R-value of the wall and ceiling spaces in the building envelope and allows more windows to be used in a design while still meeting a required average R-value for the building.

Another significant benefit of the composite insulation batt 10 is found in renovating buildings. In many areas, renovating or remodeling a sufficient percentage of a building requires that the building be brought up to current building codes. The current building codes may require a significantly higher R-value of insulation to be used in exterior surfaces of the building, or may require a higher average R-value for the building envelope as discussed above. This requirement to increase the R-value of the building envelope can cause significant difficulty in renovating older buildings. With existing insulation, it may be necessary to rebuild walls and ceilings to a greater thickness to achieve the greater R-value required for the building envelope. This requires removal of the inner surfaces (e.g. walls, ceilings) of the building and reframing these walls or ceilings to have an increased thickness. This may significantly change the architecture of the building.

The composite insulation batt 10 alleviates this problem by allowing a much higher R-value of insulation to be placed into an existing cavity without increasing the cavity thickness and reengineering the building architecture. For example, a cavity formed by 2 by 8 studs (about 7.5 inches thick) may have had R22 insulation with its existing fiberglass batts. Commercially available bubble-wrap insulation products typically have an R-value of about 1.5. The composite insulation batt 10 can provide an R-value in the 2 by 8 cavity which is about R80; notably higher than the sum of the individual R-values of the fiberglass batt 14 and sheath 18. This dramatically increases the R-value of that building surface without making it thicker. This eliminates costly reconstruction of the building envelope and makes possible some renovation work that may not have been previously possible.

The composite insulation batt 10 thus allows for construction of buildings with windows or other architectural features which compromise R-values of the building envelope while still meeting average envelope R-values required by building codes. The composite insulation batt 10 allows for the renovation of existing buildings to greatly increase the envelope R-value of the building without re-engineering the building. Costly and problematic reconstruction of the building envelope to increase its wall/ceiling thickness is avoided. New buildings may be built to have much greater envelope R-values while maintaining a desired amount of windows and without using additional framing resources to make the walls and ceilings thicker.

The composite insulation batt thus provides many benefits in increasing the R-value of desired parts of a building such as the exterior envelope. In many cases it allows for construction work which may not have otherwise been feasible under building codes.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A composite insulation batt comprising:
   a core comprising an elongate and generally rectangular batt of fiber insulation;
   a sheath surrounding front, back, and side faces of the batt core and extending along a length of the batt core, the sheath comprising:
   an inner surface;
   an outer surface comprising a layer of reflective material;
   a low density and closed cell insulating core layer disposed between the inner surface and the outer surface; and
   wherein the sheath is disposed around the batt core such that the inner surface of the sheath contacts the batt core; and
   a plurality of insulating spacers on portions of the outer surface of the sheath which cover the front face and back face of the batt core;
   wherein the plurality of insulating spacers occupy approximately 10 percent or less of the area of the surface of the sheath; and
   wherein the plurality of insulating spacers extend beyond the outer surface of the sheath so as to space the sheath apart from a surface of a building when the composite insulation batt is installed into a building.

2. The composite insulation batt of claim 1, wherein the plurality of insulating spacers extend approximately one eighth of an inch beyond the surface of the sheath.

3. The composite insulation batt of claim 1, wherein the low density and closed cell insulating core layer comprises a layer of material having a plurality of pockets which define a plurality of generally uniform bubbles.

4. The composite insulation batt of claim 1, wherein the low density and closed cell insulating core layer comprises a first layer of material having a plurality of pockets which define a plurality of generally uniform bubbles, a second layer of material having a plurality of pockets which define a plurality of generally uniform bubbles, and a generally flat layer of plastic disposed between the first layer of material and the second layer of material.

5. The composite insulation batt of claim 1, wherein the low density and closed cell insulating core layer comprises 90 percent or greater gas space.

6. The composite insulation batt of claim 1, wherein the sheath further comprises an inner layer of reflective material attached to the inner surface of the sheath, wherein the inner layer of reflective material is disposed adjacent the insulating fiberglass batt.

7. The composite insulation batt of claim 1, further comprising a first attachment flange disposed along a first side of the composite insulation batt and a second attachment flange disposed along a second side of the composite insulation batt.

8. A composite insulation batt comprising:
   a core comprising an elongate batt of a first insulation material;
   a sheath surrounding the core, the sheath comprising:
      an inner surface;
      an outer surface;
      a low density foam core layer disposed between the inner surface and the outer surface, the low density foam core comprising a second insulation material different than the first insulation material; and
   wherein the sheath is disposed around the batt such that the inner surface of the sheath contacts the batt.

9. The composite insulation batt of claim 8, wherein the composite insulation batt is sized and shaped to facilitate placement in a cavity of a building between a first surface and a second surface whereby the composite insulation batt provides thermal insulation between the first surface of the building and the second surface of the building.

10. The composite insulation batt of claim 8, wherein the core layer of the sheath comprises a layer of material having a plurality of pockets which define a plurality of uniform bubbles.

11. The composite insulation batt of claim 8, wherein the sheath outer surface comprises a reflective material.

12. The composite insulation batt of claim 8, further comprising a plurality of insulating spacers on portions of the outer surface of the sheath which cover at least one of the front face and the back face of the batt core, and wherein the plurality of insulating spacers extend beyond the outer surface of the sheath so as to space the sheath apart from a surface of a building when the composite insulation batt is installed into a building.

13. The composite insulation batt of claim 12, wherein the plurality of insulating spacers are projections formed as part of the sheath.

14. A composite insulation batt comprising:
   a core comprising an elongate batt of a first insulation material having a first face, an opposed second face, a first side extending between the first face and the second face, a second side extending between the first face and the second face, and a length;
   a sheath material comprising:
      an inner surface;
      an outer surface;
      a low density foam core layer disposed between the inner surface and the outer surface, the core comprising a second insulation material different than the first insulation material; and
   wherein the sheath material is disposed along the first face of the batt whereby the inner surface of the sheath material contacts the first face of the batt.

15. The composite insulation batt of claim 14, wherein the composite insulation batt is sized and shaped for placement in a cavity of a building between an exterior wall panel and an interior wall panel wherein the sheath material is disposed between the batt first face and a wall panel selected from the exterior wall panel and the interior wall panel.

16. The composite insulation batt of claim 15, further comprising a first spacer positioned adjacent the outer surface of the sheath material so as to space the sheath material apart from the wall panel when the composite insulation batt is installed into a building.

17. The composite insulation batt of claim 16, wherein the first spacer comprises an insulating spacer which is attached to the sheath material outer surface.

18. The composite insulation batt of claim 16, further comprising sheath material disposed along the second face of the batt whereby the inner surface of the sheath material contacts the second face of the batt, wherein the first spacer is positioned between sheath material on the batt first face and the exterior wall panel, and further comprising a second spacer positioned adjacent the outer surface of the sheath material on the batt second face so as to space the sheath material apart from the interior wall panel when the composite insulation batt is installed into a building.

19. The composite insulation batt of claim 14, further comprising sheath material disposed along the second face of the batt whereby the inner surface of the sheath material contacts the second face of the batt.

20. The composite insulation batt of claim 14, wherein the sheath material extends around the first face, the second face, the first side, and the second side of the batt.

* * * * *